United States Patent
Shiina (10) Patent No.: US 10,099,717 B2
(45) Date of Patent: Oct. 16, 2018

(54) STEERING DEVICE

(71) Applicant: JTEKT CORPORATION, Osaka-shi, Osaka (JP)

(72) Inventor: Akihiko Shiina, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 137 days.

(21) Appl. No.: 15/415,390

(22) Filed: Jan. 25, 2017

(65) Prior Publication Data

US 2017/0217475 A1 Aug. 3, 2017

(30) Foreign Application Priority Data

Feb. 2, 2016 (JP) ................................. 2016-018215

(51) Int. Cl.
| | |
|---|---|
| *B62D 3/04* | (2006.01) |
| *B62D 5/04* | (2006.01) |
| *F16D 15/00* | (2006.01) |
| *F16D 27/02* | (2006.01) |
| *B62D 5/00* | (2006.01) |
| *F16D 27/00* | (2006.01) |

(52) U.S. Cl.
CPC ............... *B62D 5/001* (2013.01); *B62D 3/04* (2013.01); *B62D 5/003* (2013.01); *B62D 5/043* (2013.01); *B62D 5/0409* (2013.01); *F16D 15/00* (2013.01); *F16D 27/02* (2013.01); *F16D 2027/008* (2013.01)

(58) Field of Classification Search
CPC ...... B62D 5/001; B62D 5/003; B62D 5/0409; B62D 5/043; B62D 3/04; F16D 15/00; F16D 27/02; F16D 2027/008
USPC .................................................. 180/402, 444
See application file for complete search history.

(56) References Cited

U.S. PATENT DOCUMENTS

| | | | |
|---|---|---|---|
| 6,419,066 B1* | 7/2002 | Kittaka ................. | F16D 27/108 192/84.96 |
| 2005/0205336 A1* | 9/2005 | Yamasaki .............. | B62D 5/003 180/402 |

(Continued)

FOREIGN PATENT DOCUMENTS

| | | |
|---|---|---|
| EP | 1939069 A1 | 7/2008 |
| EP | 1985520 A1 | 10/2008 |

(Continued)

OTHER PUBLICATIONS

Jul. 3, 2017 Extended Search Report issued in European Patent Application No. 17154218.6.

*Primary Examiner* — Anne Marie M Boehler
(74) *Attorney, Agent, or Firm* — Oliff PLC (57) ABSTRACT

A steering system includes a two-way clutch, a worm wheel that is rotatable together with an input shaft, and a coil that generates a drive force for the two-way clutch to couple/decouple the input shaft and an output shaft to/from each other. The worm wheel has a center circular plate portion fixed to the input shaft, a radial ring portion that projects forward from a peripheral edge of the center circular plate portion, and a toothed portion that projects outward in the radial direction from the radial ring portion. The two-way clutch is disposed in a space surrounded by the center circular plate portion and the radial ring portion and formed on the front side with respect to the center circular plate portion. The coil surrounds an outer peripheral surface of the radial ring portion.

8 Claims, 6 Drawing Sheets

(56) References Cited

U.S. PATENT DOCUMENTS

| | | | | |
|---|---|---|---|---|
| 2008/0185213 | A1* | 8/2008 | Mori | B62D 5/003 |
| | | | | 180/402 |
| 2011/0061983 | A1 | 3/2011 | Sato et al. | |
| 2014/0021003 | A1* | 1/2014 | Nakano | F16D 27/112 |
| | | | | 192/84.9 |
| 2016/0169300 | A1* | 6/2016 | Yamatani | F16D 27/102 |
| | | | | 192/76 |
| 2016/0368528 | A1* | 12/2016 | Shiina | B62D 3/04 |
| 2016/0368529 | A1* | 12/2016 | Shiina | B62D 3/04 |

FOREIGN PATENT DOCUMENTS

| | | |
|---|---|---|
| EP | 3109132 A1 | 12/2016 |
| EP | 3109133 A1 | 12/2016 |
| JP | 2009-293679 A | 12/2009 |

\* cited by examiner

STEERING DEVICE

INCORPORATION BY REFERENCE

The disclosure of Japanese Patent Application. No, 2016-018215 filed on Feb. 2, 2016 including the specification, drawings and abstract, is incorporated herein by reference in its entirety.

BACKGROUND OF THE INVENTION

1. Field of the Invention

The present invention relates to a steering system.

2. Description of the Related Art

Steering systems are generally configured such that a steering member and a steering operation mechanism are mechanically coupled to each other at all times. In recent years, however, there have been proposed a variety of steering systems in which switching can be made between a coupled state in which a steering member and a steering operation mechanism are mechanically coupled to each other and a decoupled state in which the steering member and the steering operation mechanism are mechanically decoupled from each other, and in which a so-called steer-by-wire configuration is implemented in the decoupled state.

A rotation transfer device described in Japanese Patent Application Publication No. 2009-293679 (JP 2009-293679 A), for example, is incorporated in the steering system in which the steer-by-wire configuration is implemented. In the rotation transfer device, switching is made between the coupled state and the decoupled state by a two-way roller clutch in accordance with whether or not an electromagnetic coil is energized.

In recent years, it has been proposed to dispose a clutch mechanism such as the rotation transfer device described in JP 2009-293679 A around a worm wheel of a speed reduction device in the steering systems. In order to avoid interference between the two-way roller clutch or the electromagnetic coil and other components, however, it is necessary not to extend the space for the arrangement of the two-way roller clutch or the electromagnetic coil in the axial direction.

SUMMARY OF THE INVENTION

An object of the present invention is to provide a steering system capable of coupling/decoupling an input shaft coupled to a worm wheel and an output shaft that is relatively rotatable with respect to the input shaft to/from each other, and capable of reducing the space for the arrangement of a clutch and a coil in the axial direction.

An aspect of the present invention provides a steering system that includes: an input shaft to which a steering force from a steering member is input; an output shaft provided so as to be relatively rotatable with respect to the input shaft and coupled to a steering operation mechanism; a worm wheel coupled to the input shaft; a clutch configured to couple/decouple the input shaft and the output shaft to/from each other; and a coil that generates a drive force for the clutch to couple/decouple the input shaft and the output shaft to/from each other. The worm wheel has a center circular plate portion coupled to the input shaft and a radial ring portion that projects from a peripheral edge of the center circular plate portion toward an opposite side from the steering member. The clutch is disposed in a space surrounded by the center circular plate portion and the radial ring portion and formed on the opposite side of the center circular plate portion from the steering member. The coil is disposed so as to surround an outer peripheral surface of the radial ring portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
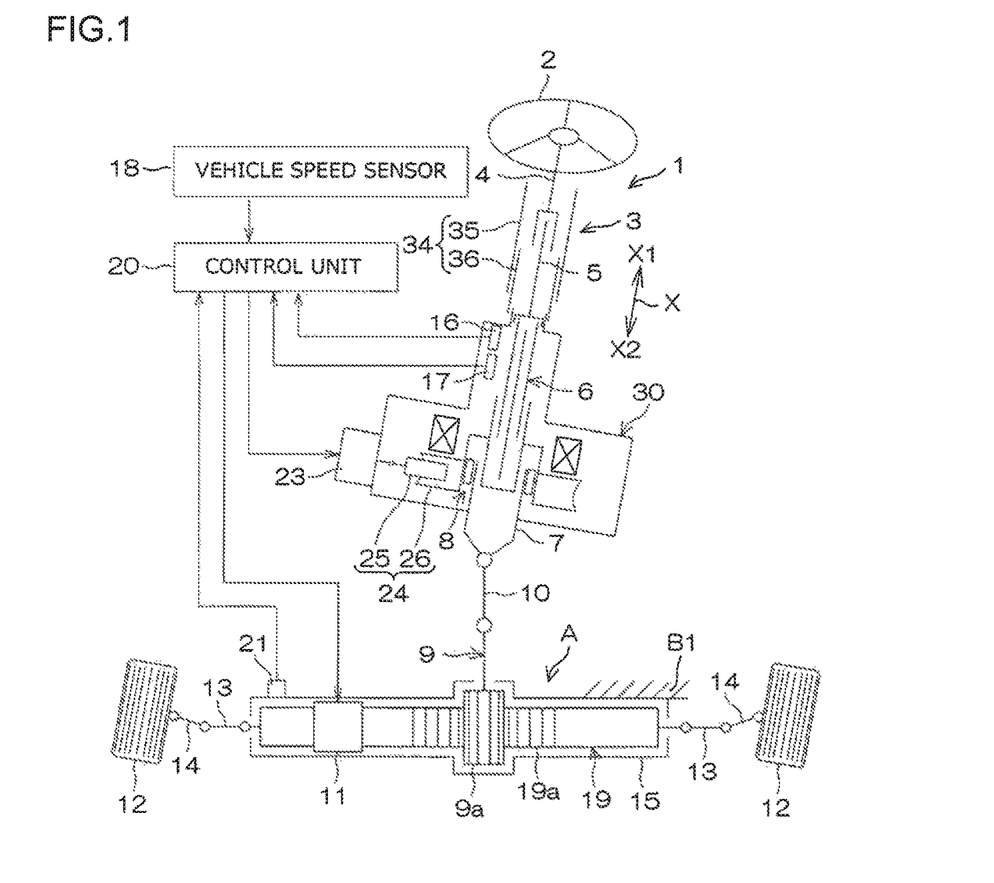
FIG. 1 illustrates a schematic configuration of a steering system according to an embodiment of the present invention.

An embodiment of the present invention will be described in detail below with reference to the accompanying drawings. FIG. 1 illustrates a schematic configuration of a steering system 1 according to an embodiment of the present invention. The steering system 1 includes an upper shaft 4, an intermediate shaft 5, an input shaft 6, an output shaft 7, and a clutch mechanism 8. The upper shaft 4 constitutes a steering shaft 3 coupled to a steering member 2 such as a steering wheel. The clutch mechanism 8 can couple/decouple the input shaft 6 and the output shaft 7 to/from each other.

A steering force from the steering member 2 is input to the input shaft 6 via the upper shaft 4 and the intermediate shaft 5. The output shaft 7 is provided so as to be relatively rotatable with respect to the input shaft 6, and coupled to a steering operation mechanism A via an intermediate shaft 10 and a pinion shaft 9.

The clutch mechanism 8 can switch the state of the steering system 1 between a coupled state in which the input shaft 6 and the output shaft 7 are mechanically coupled to each other and a decoupled state in which the input shaft 6 and the output shaft 7 are mechanically decoupled from each other.

In the coupled state, a steering force input to the input shaft 6 is output from the output shaft 7 to be transferred to the steering operation mechanism A via the intermediate shaft 10 and the pinion shaft 9 so that steered wheels 12 are steered by the steering operation mechanism A. In the coupled state, the steering operation mechanism A is directly operable by the steering member 2. In the decoupled state, a steering force from the steering member 2 is not mechanically transferred to the steering operation mechanism A, but the steering operation mechanism A is driven via an electric and electronic control system. In the decoupled state, the steering system 1 implements a so-called steer-by-wire configuration.

The steering operation mechanism A includes a rack shaft 19, a pair of tie rods 13, and a pair of knuckle arms 14. One end of each of the tie rods 13 is coupled to a corresponding end portion of the rack shaft 19. The other end of each of the tie rods 13 is coupled to a corresponding one of the steered wheels 12 via a corresponding one of the knuckle arms 14. When a steering force is transferred to the pinion shaft 9, the pinion shaft 9 is rotated. Rotation of the pinion shaft 9 is converted into motion of the rack shaft 19, on which a rack 19a meshed with a pinion 9a of the pinion shaft 9 is formed, in the axial direction (vehicle width direction). Motion of the rack shaft 19 in the axial direction varies the steered angle of the steered wheels 12.

The steering system 1 further includes a rack housing 15 that houses a portion of the pinion shaft 9 on which the pinion 9a is formed and the rack shaft 19. The rack housing 15 is fixed to a vehicle body B1. The steering system 1 includes a steering angle sensor 16 and a torque sensor 17. The steering angle sensor 16 detects the steering angle of the steering member 2. The torque sensor 17 detects a steering torque applied to the steering member 2. The steering system 1 includes a steered angle sensor 21 and a vehicle speed sensor 18. The steered angle sensor 21 detects the steered angle of the steered wheels 12. The vehicle speed sensor 18 detects the vehicle speed. Detection signals from a variety of sensors that include the steering angle sensor 16, the torque sensor 17, the steered angle sensor 21, and the vehicle speed sensor 18 are input to a control unit 20 constituted from an electronic control unit (ECU).

The steering system 1 includes a motor (not illustrated) and a steering actuator 11. The motor is driven by the control unit 20. The steering actuator 11 is constituted of a motion conversion mechanism (not illustrated) such as a ball screw device that converts a drive force of the motor into movement of the rack shaft 19 in the axial direction. When the steering member 2 is operated to rotate the steering shaft 3, the control unit 20 sets a target steered angle on the basis of the steering angle which is detected by the steering angle sensor 16 and the vehicle speed which is detected by the vehicle speed sensor 18. The control unit 20 controls drive of the steering actuator 11 on the basis of the deviation between the target steered angle and the steered angle which is detected by the steered angle sensor 21. Consequently, the steering operation mechanism A is operable by the steering member 2 in the decoupled state.

The steering system 1 includes a motor 23 and a speed reduction device 24. The speed reduction device 24 decelerates (amplifies) rotation output from the motor 23. The speed reduction device 24 includes a worm shaft 25 and a worm wheel 26. The worm shaft 25 is rotationally driven by the motor 23. The worm wheel 26 is meshed with the worm shaft 25, and coupled to the input shaft 6. The control unit 20 controls drive of the motor 23 so as to apply an appropriate reaction force in the direction opposite to the direction in which the steering member 2 is steered to the steering member 2 on the basis of the detection signals which are output from the torque sensor 17, the steering angle sensor 16, and so forth. Rotation from the motor 23 decelerated (amplified) by the speed reduction device 24 is transferred to the steering member 2 via the steering shaft 3.

The clutch mechanism 8 implements a fail-safe mechanism for the steering system 1. During normal operation of the vehicle, the control unit 20 mechanically decouples the steering member 2 and the steering operation mechanism A from each other by bringing the steering system 1 into the decoupled state by controlling the clutch mechanism 8. In the case where ignition of the vehicle is turned off or in the case of occurrence of an abnormality such as a malfunction in the steer-by-wire system, meanwhile, the control unit 20 mechanically couples the steering member 2 and the steering operation mechanism A to each other by bringing the steering system 1 into the coupled state by controlling the clutch mechanism 8.

Figure 2:
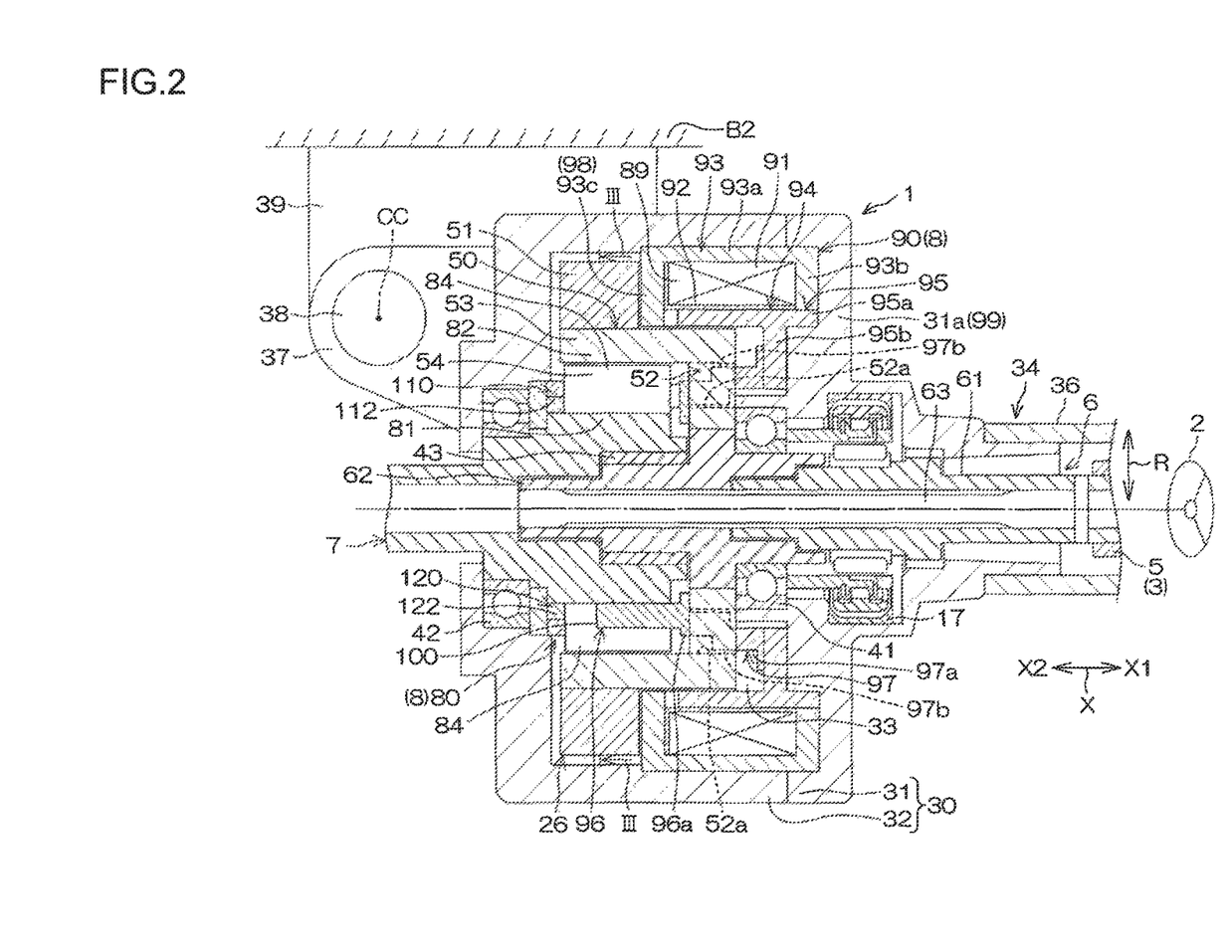
FIG. 2 is a sectional view of a housing and its surroundings.

The steering system 1 includes a housing 30 that houses at least the speed reduction device 24 and the clutch mechanism 8. The housing 30 is attached to the input shaft 6 and the output shaft 7 which are disposed coaxially with each other. FIG. 2 is a sectional view of the housing 30 and its surroundings. In the following description, the axial direction of the input shaft 6 and the output shaft 7 is defined as an axial direction X. The side of the steering member 2, which is the rear side of the vehicle, in the axial direction X is defined as a rear side X1. The side opposite to the steering member 2, which is the front side of the vehicle, in the axial direction X is defined as a front side X2. The radial direction of the input shaft 6 and the output shaft 7 is defined as a radial direction R.

With reference to FIG. 2, the housing 30 includes a sensor housing 31 and a worm wheel housing 32. The sensor housing 31 houses at least the torque sensor 17. The worm wheel housing 32 houses at least the worm wheel 26. The sensor housing 31 is provided adjacent to the worm wheel housing 32 from the rear side X1, and forms an internal space 33 of the housing 30 together with the worm wheel housing 32. A steering column 34 that surrounds the intermediate shaft 5 and the upper shaft 4 of the steering shaft 3 is coupled to an end portion of the sensor housing 31 on the rear side X1.

With reference to FIG. 1, the steering column 34 includes an upper column 35 and a lower column 36. The upper column 35 is coupled to the upper shaft 4 via a bearing (not illustrated) or the like. The lower column 36 houses the intermediate shaft 5, and is coupled to an end portion of the sensor housing 31 on the rear side X1. Unlike the embodiment, the lower column 36 may be formed integrally with the sensor housing 31. The upper shaft 4 and the intermediate shaft 5 of the steering shaft 3 are disposed coaxially with the input shaft 6. The upper shaft 4 slides in the axial direction X with respect to the intermediate shaft 5. When the upper shaft 4 slides in the axial direction X with respect to the intermediate shaft 5, the upper column 35 slides in the axial direction X with respect to the lower column 36. By sliding the upper shaft 4 in the axial direction X with respect to the intermediate shaft 5, the position of the steering member 2 is adjusted in the front-rear direction of the vehicle (so-called "telescopic adjustment").

With reference to FIG. 2, a tilt bracket 37 is provided at an end portion of the worm wheel housing 32 on the front side X2. The tilt bracket 37 is coupled to a fixed bracket 39, which is fixed to the vehicle body B2, via a tilt center shaft 38 that extends in a direction orthogonal to the axial direction X. The housing 30, the steering shaft 3, and the steering column 34 are turnable (tiltable) about a center axis CC of the tilt center shaft 38. By turning (tilting) about the tilt center CC the housing 30, the steering shaft 3, and the steering column 34, the position of the steering member 2 is adjusted in the height direction (so-called "tilt adjustment").

The input shaft 6 includes a first shaft 61, a second shaft 62, and a torsion bar 63. The first shaft 61 is fixed coaxially with the intermediate shaft 5. The worm wheel 26 is fixed as externally fitted with the second shaft 62. The torsion bar 63 couples the first shaft 61 and the second shaft 62 coaxially with each other. The second shaft 62 is relatively rotatable with respect to the first shaft 61. The second shaft 62 is rotatably supported by the sensor housing 31 via a first bearing 41. The output shaft 7 projects toward the front side X2 from the worm wheel housing 32. The output shaft 7 is rotatably supported by the worm wheel housing 32 via a second bearing 42. The output shaft 7 surrounds an end portion of the second shaft 62 of the input shaft 6 on the front side X2. The output shaft 7 is relatively rotatable with respect to the second shaft 62 with the output shaft 7 supported coaxially with the second shaft 62. Particularly, a third bearing 43 is interposed between the output shaft 7 and the second shaft 62. The third bearing 43 may be a plain bearing as in the embodiment, and may be a rolling bearing unlike the embodiment.

The worm wheel 26 includes a core metal 50 and a toothed portion 51. The core metal 50 is coupled to the second shaft 62 so as to be rotatable together with the second shaft 62. The toothed portion 51 surrounds the periphery of the core metal 50. The toothed portion 51 is made of a resin, for example. In the case where the toothed portion 51 is made of a resin, the toothed portion 51 may be formed by resin molding (insert molding) with the core metal 50 inserted in a mold. The core metal 50 is a magnetic body, for example. The core metal 50 is coupled to the toothed portion 51 by insertion molding so as to be rotatable together with the toothed portion 51. The core metal 50 has a center circular plate portion 52 and a radial ring portion 53. The center circular plate portion 52 is coupled to the input shaft 6. The radial ring portion 53 projects toward the front side X2 from the peripheral edge of the center circular plate portion 52 (an end portion on the outer side in the radial direction R).

The center circular plate portion 52 has an annular shape to bulge outward in the radial direction R orthogonal to the axial direction X. The center circular plate portion 52 is coupled to the second shaft 62 so as to be rotatable together with the second shaft 62 and immovable in the axial direction X. The radial ring portion 53 has an annular shape to extend in the axial direction X. The toothed portion 51 projects outward in the radial direction R from the distal end of the radial ring portion 53 (an end portion on the front side X2). The core metal 50 forms a space 54 surrounded by the center circular plate portion 52 and the radial ring portion 53 and positioned on the front side X2 of the center circular plate portion 52.

The clutch mechanism 8 includes a two-way clutch 80 (clutch) and an electromagnetic clutch 90. The two-way clutch 80 can couple/decouple the input shaft 6 and the output shaft 7 to/from each other. The electromagnetic clutch 90 causes the two-way clutch 80 to couple/decouple the input shaft 6 and the output shaft 7 to/from each other. At least a part of the two-way clutch 80 is disposed in the space 54. Unlike the embodiment, the entirety of the two-way clutch 80 may be disposed in the space 54.

Figure 3:
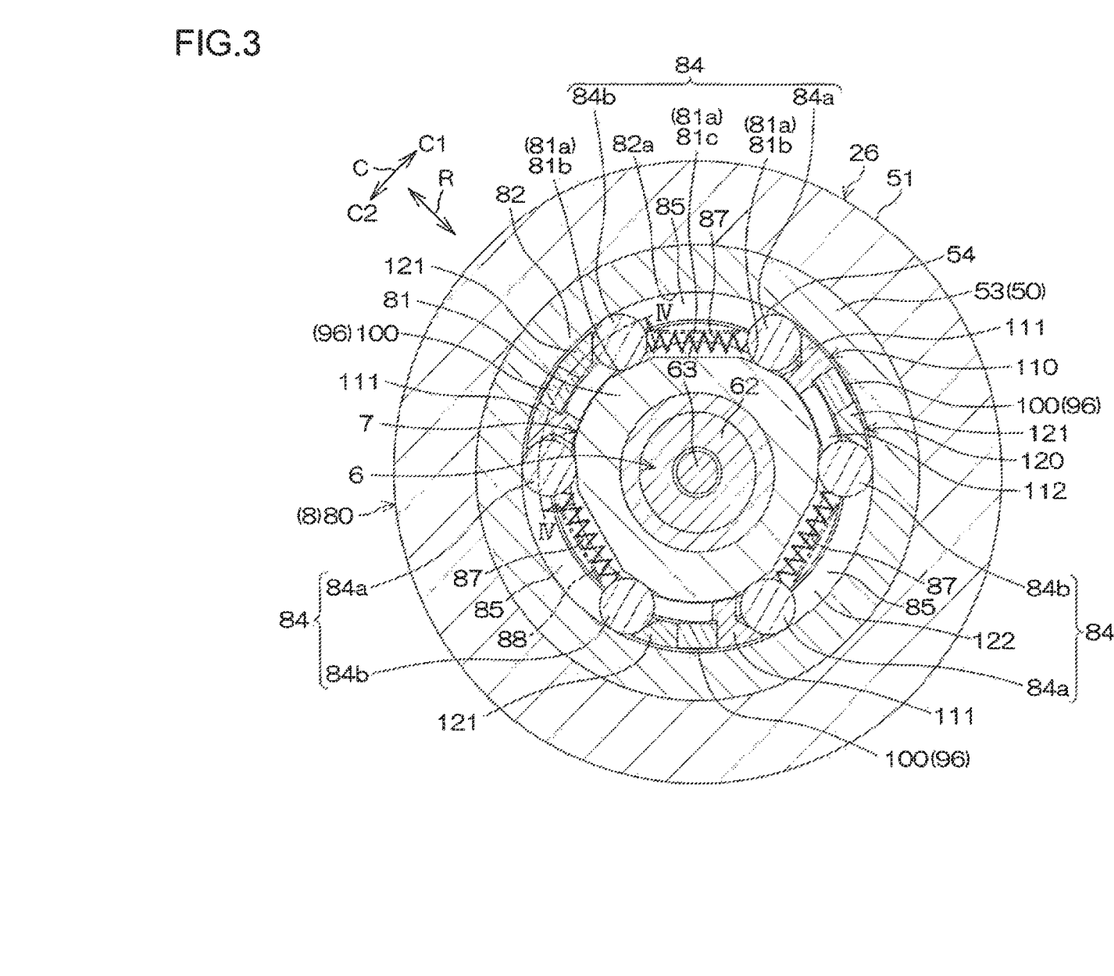
FIG. 3 is a cross-sectional view taken along the line III-III of FIG. 2.

FIG. 3 is a cross-sectional view taken along the line III-III of FIG. 2. The circumferential direction of the input shaft 6 and the output shaft 7 is defined as a circumferential direction C. Of the circumferential direction C, the clockwise direction with the output shaft 7 seen from the rear side X1 with respect to the output shaft 7 is defined as a C1 direction. The counterclockwise direction with the output shaft 7 seen from the rear side X1 with respect to the output shaft 7 is defined as a C2 direction. The two-way clutch 80 includes an inner ring 81 and an outer ring 82. The inner ring 81 is provided at the rear end portion of the output shaft 7. The outer ring 82 is provided to the radial ring portion 53 of the core metal 50 of the worm wheel 26, and is relatively rotatable with respect to the inner ring 81. The axial direction of the inner ring 81 and the outer ring 82 coincides with the axial direction X. The circumferential direction of the inner ring 81 and the outer ring 82 coincides with the circumferential direction C. The radial direction of the inner ring 81 and the outer ring 82 coincides with the radial direction R.

The two-way clutch 80 further includes roller pairs 84 and pairs of pressing members (a first pressing member 110 and a second pressing member 120). The roller pairs 84 are disposed in a wedged space 85 or a plurality of (in the embodiment, three) wedged spaces 85 such that the rollers of each roller pair 84 are arranged side by side in the circumferential direction C. The wedged spaces 85 are formed by the outer periphery of the inner ring 81 and the inner periphery of the outer ring 82. The pair of pressing members (the first pressing member 110 and the second pressing member 120) are provided so as to be relatively rotatable about the input shaft 6 (i.e. in the circumferential direction C).

Each of the roller pairs 84 includes a first roller 84a and a second roller 84b disposed in the same wedged space 85. The second roller 84b is disposed on the C2 direction side with respect to the first roller 84a which constitutes the same roller pair 84. Each of the wedged spaces 85 is defined by a cylindrical surface 82a formed on the inner periphery of the outer ring 82 and a cam surface 81a formed on the outer periphery of the inner ring 81 to face the cylindrical surface 82a in the radial direction. R. The cam surface 81a includes a pair of inclined surfaces 81b and a flat spring support surface 81c. The pair of inclined surfaces 81b are provided so as to be inclined in opposite directions with respect to the circumferential direction C. The spring support surface 81c is provided between the pair of inclined surfaces 81b, and is orthogonal to the radial direction R. Each of the wedged spaces 85 becomes narrower toward both ends in the circumferential direction. C.

The two-way clutch 80 further includes an elastic member 87 disposed in each of the wedged spaces 85 to elastically urge the first roller 84a and the second roller 84b away from each other. The elastic member 87 may be a coil spring or the like. As indicated by the long dashed double-short dashed lines, a plurality of elastic members 87 may be collectively held by a cage 88 attached to the inner ring 81, for example.

The first pressing member 110 can be turned in the C2 direction to press the first roller 84a of each of the roller pairs 84 in the C2 direction. The second pressing member 120 can be turned in the C1 direction to press the second roller 84b of each of the roller pairs 84 in the C1 direction. That is, the first pressing member 110 and the second pressing member 120 can press the first roller 84a and the corresponding second roller 84b such that the first roller 84a and the second roller 84b approach each other.

The first pressing member 110 includes a columnar first pressing portion 111 and an annular first support portion 112. The columnar first pressing portions 111 are arranged in the circumferential direction C and extend along the axial direction X. The number of first pressing portions 111 matches the number (in the embodiment, three) of the roller pairs 84. The first support portion 112 collectively supports the first pressing portions 111. The first pressing portions 111 and the first support portion 112 may be provided integrally with each other using a synthetic resin material or a metal material. The first pressing member 110 may function as a cage that holds the roller pairs 84 and the elastic members 87. The first support portion 112 is disposed on the front side X2 with respect to the plurality of roller pairs 84 (see FIG. 2).

The second pressing member 120 includes a columnar second pressing portion 121 and an annular second support portion 122. The columnar second pressing portions 121 are arranged in the circumferential direction C and extend along the axial direction X. The number of second pressing portions 121 matches the number (in the embodiment, three) of the roller pairs 84. The second support portion 122 collectively supports the second pressing portions 121. The second pressing portions 121 and the second support portion 122 may be provided integrally with each other using a synthetic resin material or a metal material. The second pressing member 120 may function as a cage that holds the roller pairs 84 and the elastic members 87. The second support portion 122 is disposed on the front side X2 with respect to the plurality of roller pairs 84 (see FIG. 2).

The first pressing member 110 and the second pressing member 120 are supported by the output shaft 7 so as to be relatively rotatable with respect to the inner ring 81 and the outer ring 82. The first pressing member 110 and the second pressing member 120 are assembled such that the first pressing portion 111 and the second pressing portion 121 are alternately arranged side by side in the circumferential direction C. With reference to FIG. 2, the inner ring 81 is integrally coupled to the outer peripheral portion of the rear end portion of the output shaft 7, and the outer ring 82 is integrally coupled to the inner peripheral portion of the radial ring portion 53. Therefore, the inner ring 81 and the outer ring 82 are disposed in the space 54. The plurality of roller pairs 84 and the elastic members 87 are disposed in the space 54. As in the embodiment, the entirety of the inner ring 81, the outer ring 82, the plurality of roller pairs 84, and the plurality of elastic members 87 may be disposed in the space 54. With reference to FIG. 3, of the first pressing member 110, at least the first pressing portions 111 are disposed in the space 54. Of the second pressing member 120, at least the second pressing portions 121 are disposed in the space 54.

With reference to FIG. 2, the electromagnetic clutch 90 includes a coil 91, an annular support member 92, a magnetism collecting ring 93, and an actuation mechanism 94. The coil 91 generates an electromagnetic force (drive force) for the two-way clutch 80 to couple/decouple the input shaft 6 and the output shaft 7 to/from each other. The support member 92 supports the coil 91. The magnetism collecting ring 93 covers the coil 91 from at least the outer side in the radial direction R. The actuation mechanism 94 receives the electromagnetic force from the coil 91 to actuate the two-way clutch 80.

The coil 91 is disposed so as to surround the outer peripheral surface of the radial ring portion 53 of the core metal 50 of the worm wheel 26. Particularly, the coil 91 surrounds a portion of the outer peripheral surface of the radial ring portion 53, which is on the rear side X1 with respect to the toothed portion 51 of the worm wheel 26. The coil 91 faces the toothed portion 51 from the rear side X1. A portion of the coil 91 on the front side X2 is disposed in a space 89 positioned on the rear side X1 with respect to the toothed portion 51 around the outer peripheral surface of the radial ring portion 53. The support member 92 contacts the inner peripheral surface and the front end surface of the coil 91.

In the embodiment, the magnetism collecting ring 93 covers the coil 91 also from both sides in the axial direction X. Particularly, the magnetism collecting ring 93 includes a tubular portion 93a, an annular first projecting portion 93b, and an annular second projecting portion 93c. The tubular portion 93a extends in the axial direction X to cover the coil 91 from the outer side in the radial direction R. The first projecting portion 93b projects inward in the radial direction R from the rear end portion of the tubular portion 93a in the axial direction X. The second projecting portion 93c projects inward in the radial direction R from the front end portion of the tubular portion 93a in the axial direction X. The first projecting portion 93b covers the coil 91 from the rear side X1. The second projecting portion 93c covers the coil 91 from the front side X2.

At least end portions of the coil 91 and the magnetism collecting ring 93 on the front side X2 face the space 54 in the radial direction R. The coil 91, the support member 92, and the magnetism collecting ring 93 are non-rotatably supported by the worm wheel housing 32. The worm wheel 26 has a plurality of insertion holes 52a that penetrate the center circular plate portion 52 in the axial direction X. Unlike the embodiment, the plurality of insertion holes 52a may be formed across the center circular plate portion 52 and the radial ring portion 53. The plurality of insertion holes 52a are provided at intervals in the circumferential direction C.

Figure 4:
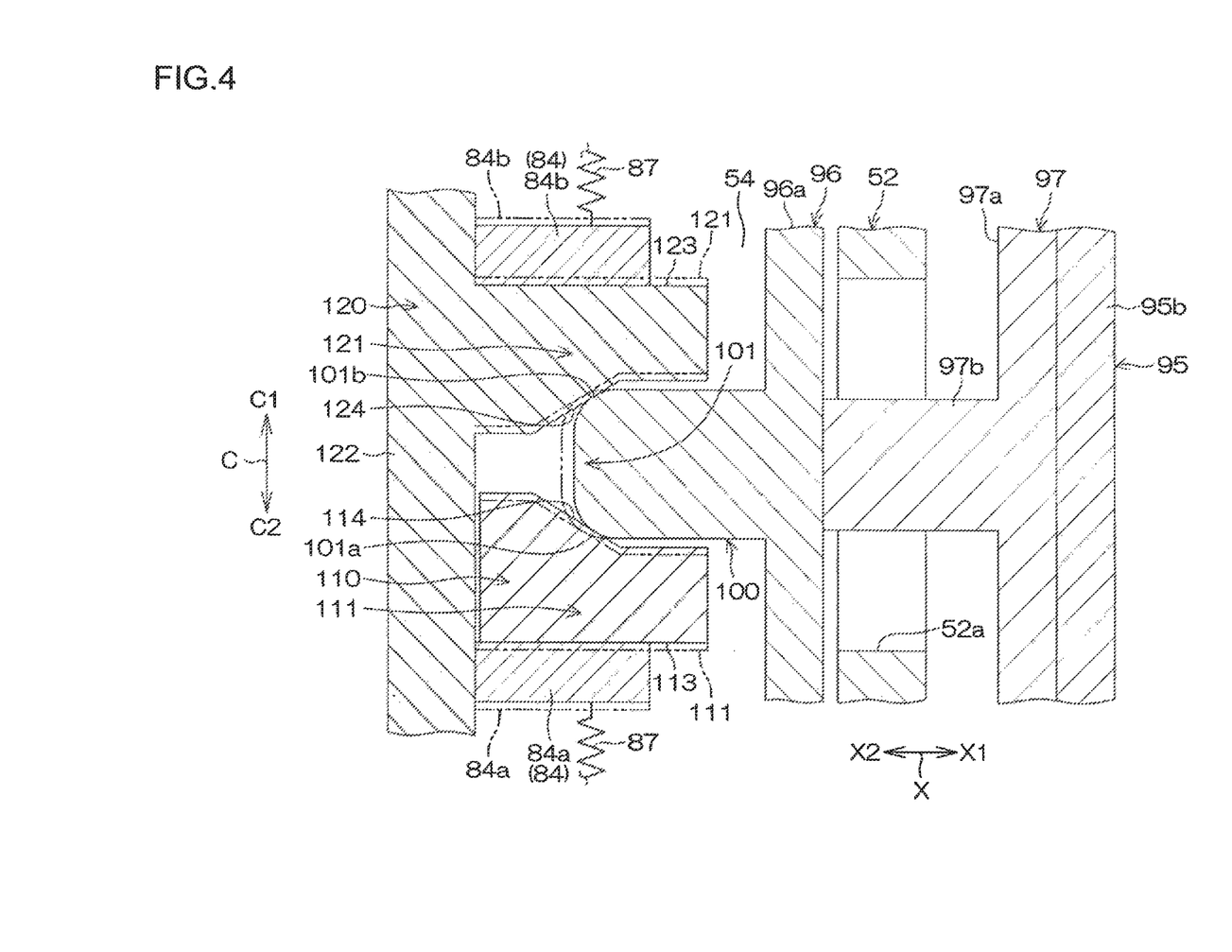
FIG. 4 is a sectional view taken along the line IV-IV of FIG. 3.
Figure 5:
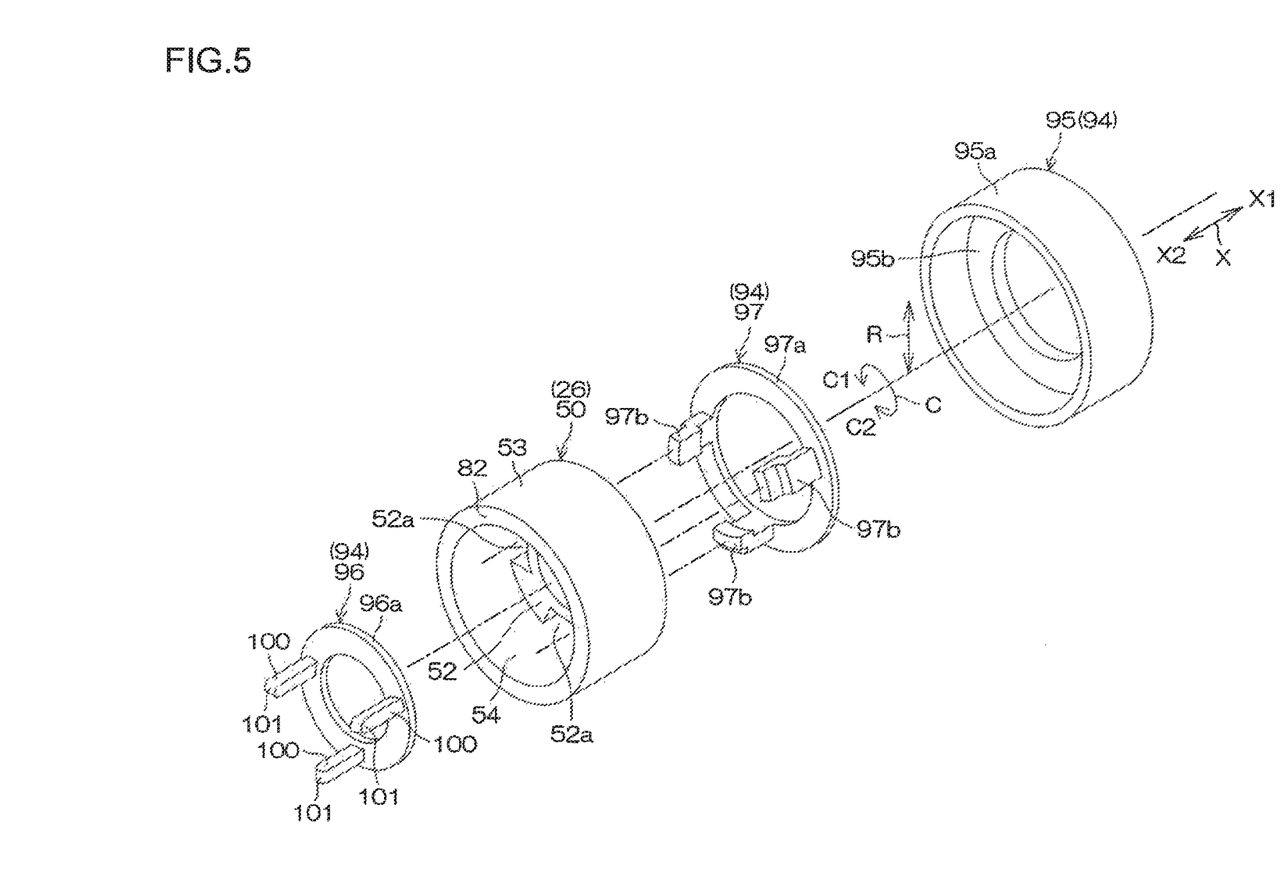
FIG. 5 is an exploded perspective view of an actuation mechanism and its surroundings.

The actuation mechanism 94 includes a movable member 95, an actuation member 96, and a transfer member 97. The movable member 95 is movable along the axial direction X in accordance with an electromagnetic force (drive force). The actuation member 96 is disposed in the space 54, and moved back and forth (in the axial direction X) to actuate the two-way clutch 80. The transfer member 97 is inserted into the insertion holes 52a, and transmits operation of the movable member 95 to the actuation member 96. FIG. 4 is a sectional view taken along the line IV-IV of FIG. 3. In FIG. 4, the elastic members 87 are not actually seen, but are illustrated for the convenience of description. FIG. 5 is an exploded perspective view of the actuation mechanism 94 and its surroundings.

With reference to FIGS. 4 and 5, the movable member 95 is a magnetic body. The movable member 95 includes a tubular portion 95a and a flange portion 95b. The tubular portion 95a extends along the inner peripheral surface of the support member 92 (see FIG. 2). The flange portion 95b bulges inward in the radial direction R from the tubular portion 95a. The tubular portion 95a is movable in the axial direction X between a pair of restriction portions 98 and 99 disposed with a predetermined clearance therebetween in the axial direction X. The restriction portion 98 on the front side X2 is the second projecting portion 93c of the magnetism collecting ring 93, for example. The restriction portion 99 on the rear side X1 is a wall portion 31a of the sensor housing 31 that defines the internal space 33 from the rear side X1, for example.

The flange portion 95b is disposed on the rear side X1 with respect to the center circular plate portion 52, and faces the center circular plate portion 52 from the rear side X1. The flange portion 95b is moved together with the tubular portion 95a. Of the movable member 95, at least the flange portion 95b is moved along the axial direction X on the rear side X1 with respect to the center circular plate portion 52. Particularly, the flange portion 95b is moved in the axial direction X between the center circular plate portion 52 and the wall portion 31a of the sensor housing 31.

The transfer member 97 is preferably a non-magnetic body. The transfer member 97 includes an annular portion 97a and a plurality of transfer pins 97b. The annular portion 97a abuts against the flange portion 95b of the movable member 95. The transfer pins 97b project toward the front side X2 from the annular portion 97a. The number of transfer pins 97b is the same as that of the insertion holes 52a. Each of the transfer pins 97b are inserted through the corresponding insertion holes 52a. The distal ends of the plurality of the transfer pins 97b are positioned in the space 54 (see FIG. 4).

The actuation member 96 includes an annular portion 96a and a plurality of separators 100. The annular portion 96a is pressed by the distal ends of the plurality of transfer pins 97b. The separators 100 project toward the front side X2 from the annular portion 96a. The separators 100 extend along the axial direction X. The number of the separators 100 is the same as that of the roller pairs 84. The actuation member 96 is provided so as to be movable in the axial direction X. The transfer member 97 is rotatable in the circumferential direction C together with the worm wheel 26 and the input shaft 6. A clearance in the circumferential direction C may be provided between end portions of the insertion holes 52a in the circumferential direction C and the corresponding transfer pins 97b so that the transfer member 97 and the worm wheel 26 are slightly relatively rotatable with respect to each other (see FIG. 4). The transfer member 97 is relatively rotatable with respect to the actuation member 96. The flange portion 95b of the movable member 95 and the annular portion 97a of the transfer member 97 may be coupled to each other. In this case, the movable member 95 is rotatable in the circumferential direction C together with the transfer member 97, the worm wheel 26, and the input shaft 6.

With reference to FIG. 4, each of the first pressing portions 111 is disposed between the corresponding separator 100 and the corresponding first roller 84a. A first abutment surface 113 capable of abutting against (pressing) the first roller 84a is formed on a side surface of each of the first pressing portions 111 on the C2 direction side. A first slide-contacted surface 114 is formed on a surface of each of the first pressing portions 111 on the C1 direction side. The first slide-contacted surface 114 is configured to be directed in the C1 direction as the first slide-contacted surface 114 extends toward the front side X2, and is brought into slide contact with the corresponding separator 100.

Each of the second pressing portions 121 is disposed between the corresponding separator 100 and the corresponding second roller 84b. A second abutment surface 123 capable of abutting against (pressing) the second roller 84b is formed on a side surface of each of the second pressing portions 121 on the C1 direction side. A second slide-contacted surface 124 is formed on a surface of each of the second pressing portions 121 on the C2 direction side. The second slide-contacted surface 124 is configured to be directed in the C2 direction as the second slide-contacted surface 124 extends toward the front side X2, and is brought into slide contact with the corresponding separator 100.

The separator 100 is engageable with the first pressing portion 111 and the second pressing portion 121. A wedged portion 101 that becomes narrower toward the front side X2 is provided at an end portion of the separator 100 on the front side X2. The wedged portion 101 includes a first slide contact surface 101a provided on a side surface on the C2 direction side and a second slide contact surface 101b provided on a side surface on C1 direction side. The first slide contact surface 101a is slidable on (engageable with) the first slide-contacted surface 114. The second slide contact surface 101b is slidable on (engageable with) the second slide-contacted surface 124.

The first slide contact surface 101a is an inclined surface directed in the C1 direction as the first slide contact surface 101a extends toward the front side X2. The second slide contact surface 101b is an inclined surface directed in the C2 direction as the second slide contact surface 101b extends toward the front side X2.

In the embodiment, the first slide contact surface 101a and the second slide contact surface 101b are formed like a part of a spherical surface. However, the first slide contact surface 101a and the second slide contact surface 101b may be formed as a flat inclined surface.

The separator 100 is movable between a first position (the position of the separator 100 indicated by the continuous line in FIG. 4), at which the separator 100 is displaced most toward the rear side X1, and a second position (the position of the separator 100 indicated by the long dashed double-short dashed line in FIG. 4), at which the separator 100 is displaced most toward the front side X2. The steering system 1 is in the coupled state, in which the input shaft 6 and the output shaft 7 are coupled to each other, when the separator 100 is at the first position. The steering system 1 is in the decoupled state, in which the input shaft 6 and the output shaft 7 are decoupled from each other, when the separator 100 is at the second position.

Particularly, when the coil 91 is energized, the movable member 95 is moved toward the front side X2 by an electromagnetic force. Consequently, the annular portion 97a of the transfer member 97 is pressed by the flange portion 95b of the movable member 95 so that the transfer member 97 is moved toward the front side X2. The plurality of separators 100 of the actuation member 96 are pressed by the distal ends of the plurality of transfer pins 97b of the transfer member 97 to be moved toward the front side X2. Consequently, the plurality of separators 100 are displaced toward the front side X2 to be disposed at the second position (the position indicated by the long dashed double-short dashed line in FIG. 4).

When each of the separators 100 is displaced toward the front side X2 toward the second position, the first slide contact surface 101a of the separator 100 slides on the first slide-contacted surface 114 of the first pressing portion 111 while pressing the first pressing portion 111 in the C2 direction. Consequently, the first pressing portion 111 is moved in the C2 direction. At the same time, the second slide contact surface 101b of the separator 100 slides on the second slide-contacted surface 124 of the second pressing portion 121 while pressing the second pressing portion 121 in the C1 direction. Consequently, the second pressing portion 121 is moved in the C1 direction. As a result, the first pressing member 110 is turned in the C2 direction with respect to the separator 100, and the second pressing member 120 is turned in the C1 direction with respect to the separator 100. That is, the first pressing member 110 and the second pressing member 120 are turned in predetermined directions opposite to each other.

Figure 6:
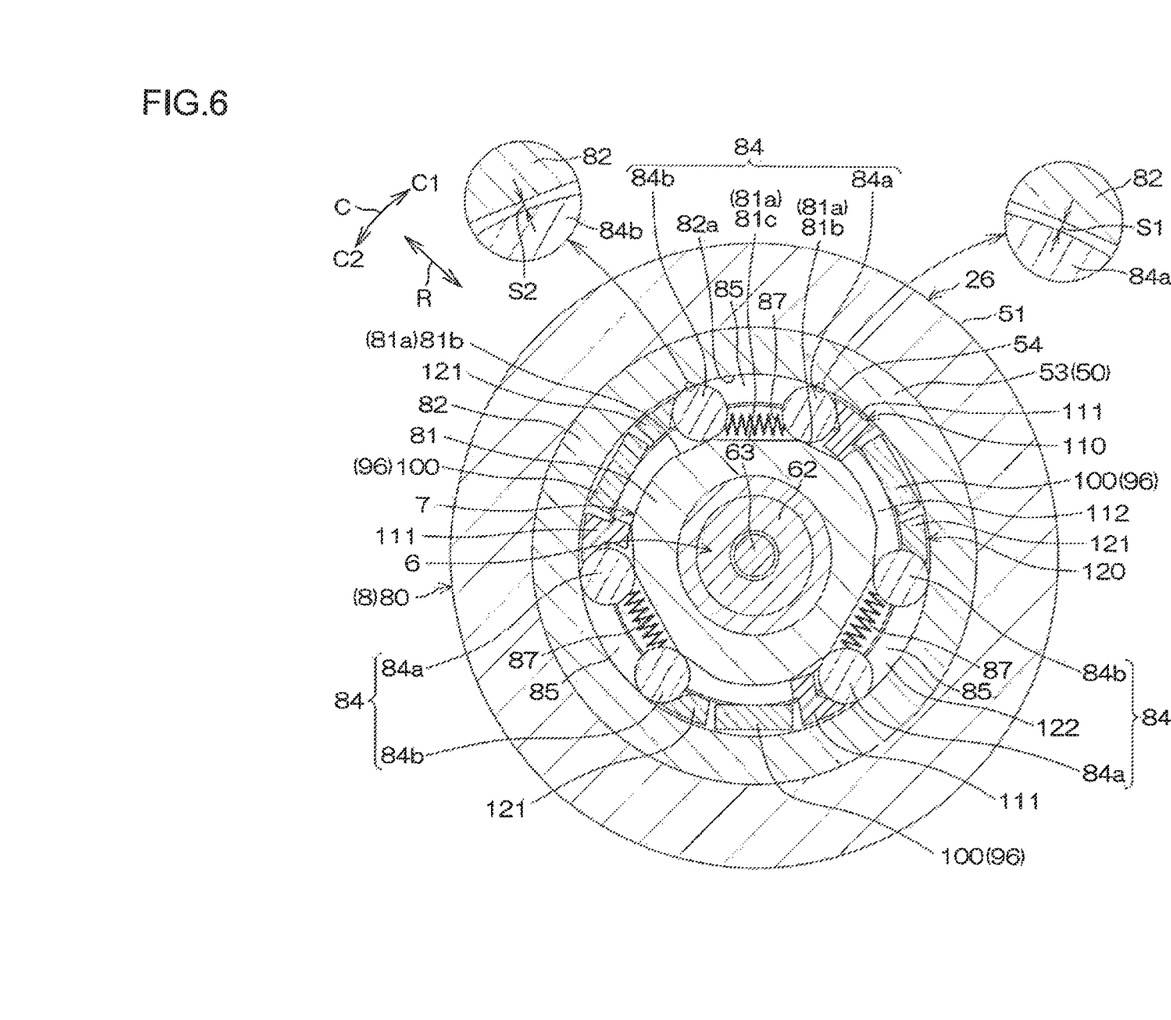
FIG. 6 is a schematic view illustrating a decoupled state in FIG. 3.

As the first pressing member 110 is turned in the C2 direction with respect to the separator 100, each of the first pressing portions 111 is moved in the C2 direction. As a result, the first abutment surface 113 of each of the first pressing portions 111 presses the corresponding first roller 84a in the C2 direction against the urging force of the elastic member 87. Therefore, each of the first rollers 84a is moved in the C2 direction. Consequently, a clearance S1 is formed between each of the first rollers 84a and the outer ring 82 as illustrated in FIG. 6. That is, each of the first rollers 84a and the outer ring 82 are disengaged from each other.

As the second pressing member 120 is turned in the C1 direction with respect to the separator 100, each of the second pressing portions 121 is moved in the C1 direction. As a result, the second abutment surface 123 of each of the second pressing portions 121 presses the corresponding second roller 84b in the C1 direction against the urging force of the elastic member 87. Therefore, each of the second rollers 84b is moved in the C1 direction. Consequently, a clearance S2 is formed between each of the second rollers 84b and the outer ring 82 as illustrated in FIG. 6. That is, each of the second rollers 84b and the outer ring 82 are disengaged from each other.

Thus, the steering system 1 is brought into the decoupled state. In the decoupled state, unlike the embodiment, the roller 84a and the roller 84b and the inner ring 81 may be disengaged from each other with a clearance formed between the roller 84a and the roller 84b and the inner ring 81.

When the coil 91 is de-energized, the movable member 95 is not attracted by the coil 91 any more, and therefore is moved toward the rear side X1. Therefore, the transfer member 97 is not pressed by the movable member 95 any more. The actuation member 96 is not pressed by the plurality of transfer pins 97b of the transfer member 97 any more.

The first pressing portion 111 and the second pressing portion 121 are not pressed by the separator 100 any more. The roller pair 84 is not pressed by the first pressing portion 111 and the second pressing portion 121 any more. Therefore, the first roller 84a and the corresponding second roller 84b are moved in directions away from each other by the urging force of the elastic member 87. The first roller 84a is moved in the C1 direction, and the corresponding second roller 84b is moved in the C2 direction. As a result, the roller pair 84 and the outer ring 82 are engaged with each other to establish the coupled state in which the input shaft 6 and the output shaft 7 are coupled to each other again.

At the same time, the plurality of separators 100 are pressed by the first pressing portion 111 and the second pressing portion 121 to be moved toward the rear side X1. Consequently, the plurality of separators 100 are displaced toward the rear side X1 to be disposed at the first position (the position indicated by the continuous line in FIG. 4). In the embodiment, the two-way clutch 80 is actuated by an electromagnetic force generated by the coil 91 to be able to couple/decouple the input shaft 6 and the output shaft 7 to/from each other.

The two-way clutch 80 is disposed in the space 54 which is surrounded by the center circular plate portion 52 and the radial ring portion 53 of the worm wheel 26 and which is formed on the front side X2 of the center circular plate portion 52. The coil 91 is disposed so as to surround the outer peripheral surface of the radial ring portion 53. Thus, it is possible to reduce the space for the arrangement of the two-way clutch 80 and the coil 91 and hence the electromagnetic clutch 90 in the axial direction X.

The space for the arrangement of the two-way clutch 80 and the coil 91 is reduced on the front side X2 with respect to the worm wheel 26. Consequently, it is possible to avoid interference between the two-way clutch 80 and the coil 91 and the tilt bracket 37, the tilt center shaft 38, and the fixed bracket 39. Therefore, the tilt bracket 37, the tilt center shaft 38, and the fixed bracket 39 can be provided in the same arrangement as a steering system not provided with the clutch mechanism 8. Thus, it is not necessary to change the adjustment range for tilt adjustment. Therefore, tilt adjustment can be made in the same manner as a steering system not provided with the clutch mechanism 8.

The space for the arrangement of the two-way clutch 80 and the coil 91 is reduced on the rear side X1 with respect to the worm wheel 26. Consequently, it is possible to avoid elongation of the housing 30 toward the rear side X1. Therefore, it is possible to secure a sufficient slide distance of the upper column 35 with respect to the lower column 36 during telescopic adjustment. Thus, telescopic adjustment can be made in the same manner as a steering system not provided with the clutch mechanism 8.

Tilt adjustment and telescopic adjustment can be made in the same manner as conventionally. Therefore, it is possible to reduce degradation of a steering feel, and to improve the versatility of the steering system 1.

It is not necessary to redesign the intermediate shaft 10 and other components mounted on the vehicle (such as an instrument panel reinforce and a steering support member). Consequently, the cost of the entire vehicle can be reduced.

The coil 91 is covered by the magnetism collecting ring 93 from at least the outer side in the radial direction R. Consequently, it is possible to reduce leakage of magnetic flux generated by the coil 91 to the outside. In the case where the magnetism collecting ring 93 covers the coil 91 also from both sides in the axial direction X as in the embodiment, it is possible to further reduce leakage of magnetic flux generated by the coil 91 to the outside. In the case where the transfer member 97 is provided as a non-magnetic body, it is possible to even further reduce leakage of magnetic flux generated by the coil 91 to the outside. Even in the case where the transfer member 97 is provided as a magnetic body, magnetic flux generated by the coil 91 does not pass through a magnetic body other than the movable member 95 and the transfer member 97, and thus the influence on electronic devices such as an ECU can be reduced.

In the two-way clutch 80, the first pressing member 110 and the second pressing member 120 are turned in predetermined directions opposite to each other from a state in which the roller pair 84 is engaged with both the inner ring 81 and the outer ring 82. That is, the first pressing member 110 is turned in the C2 direction, and the second pressing member 120 is turned in the C1 direction. Consequently, the first roller 84a and the second roller 84b are moved so as to approach each other. Consequently, the input shaft 6 and the output shaft 7 are decoupled from each other with the roller pair 84 disengaged from at least one of the inner ring 81 and the outer ring 82. When the roller pair 84 is not pressed by the first pressing member 110 and the second pressing member 120, conversely, the first roller 84a and the second roller 84b are elastically urged away from each other. Consequently, the input shaft 6 and the output shaft 7 are coupled to each other with the roller pair 84 engaged with both the inner ring 81 and the outer ring 82. Consequently, in the steering system 1, the input shaft 6 and the output shaft 7 can be easily coupled to/decoupled from each other by the two-way clutch 80.

The transfer member 97, which is inserted through the insertion holes 52a of the center circular plate portion 52 of the worm wheel 26, transfers operation of the movable member 95, which moves along the axial direction X on the rear side X1 with respect to the center circular plate portion 52 in accordance with a drive force from the coil 91, to the actuation member 96 which is disposed in the space 54. The actuation member 96 can actuate the two-way clutch 80 by moving along the axial direction X with operation of the movable member 95 transferred to the actuation member 96. Thus, with the steering system 1, the two-way clutch 80 and the coil 91 can be disposed at desired positions without providing a complicated mechanism. That is, the two-way clutch 80 can be disposed in the space 54, and the coil 91 can be disposed so as to surround the outer peripheral surface of the radial ring portion 53. Hence, it is possible to further reduce the space for the arrangement of the two-way clutch 80 and the coil 91 and hence the electromagnetic clutch 90 in the axial direction X.

The present invention is not limited to the embodiment described above, and may be modified in various ways within the scope of the claims.

What is claimed is:

1. A steering system comprising:
    an input shaft to which a steering force from a steering member is input;
    an output shaft provided so as to be relatively rotatable with respect to the input shaft and coupled to a steering operation mechanism;
    a worm wheel coupled to the input shaft;
    a clutch configured to couple/decouple the input shaft and the output shaft to/from each other; and
    a coil that generates a drive force for the clutch to couple/decouple the input shaft and the output shaft to/from each other, wherein
    the worm wheel has a center circular plate portion coupled to the input shaft and a radial ring portion that projects from a peripheral edge of the center circular plate portion toward an opposite side from the steering member,
    the clutch is disposed in a space surrounded by the center circular plate portion and the radial ring portion and formed on the opposite side of the center circular plate portion from the steering member, and
    the coil is disposed so as to surround an outer peripheral surface of the radial ring portion.

2. The steering system according to claim 1, further comprising:
    a magnetism collecting ring that covers the coil from at least an outer side in a radial direction.

3. The steering system according to claim 1, wherein the worm wheel has an insertion hole that penetrates the center circular plate portion, and includes:
    a movable member that is movable along an axial direction of the input shaft on a side of the steering member with respect to the center circular plate portion in accordance with the drive force;
    an actuation member disposed in the space and movable in the axial direction to actuate the clutch; and
    a transfer member inserted through the insertion hole to transfer operation of the movable member to the actuation member.

4. The steering system according to claim 2, wherein the worm wheel has an insertion hole that penetrates the center circular plate portion, and includes:
    a movable member that is movable along an axial direction of the input shaft on a side of the steering member with respect to the center circular plate portion in accordance with the drive force;
    an actuation member disposed in the space and movable in the axial direction to actuate the clutch; and
    a transfer member inserted through the insertion hole to transfer operation of the movable member to the actuation member.

5. The steering system according to claim 1, wherein the clutch includes:
    an inner ring provided to the input shaft;
    an outer ring provided to the radial ring portion of the worm wheel so as to be relatively rotatable with respect to the inner ring;
    a roller pair having rollers disposed side by side in a circumferential direction of the inner ring in a wedged space formed by an outer periphery of the inner ring and an inner periphery of the outer ring;
    an elastic member provided between the rollers of the roller pair to elastically urge the rollers away from each other; and
    a pair of pressing members, the pressing members being relatively rotatable with respect to the input shaft and turned in predetermined directions opposite to each other to press the rollers of the roller pair such that the rollers approach each other against the urging by the elastic members.

6. The steering system according to claim 2, wherein the clutch includes:
    an inner ring provided to the input shaft;
    an outer ring provided to the radial ring portion of the worm wheel so as to be relatively rotatable with respect to the inner ring;
    a roller pair having rollers disposed side by side in a circumferential direction of the inner ring in a wedged space formed by an outer periphery of the inner ring and an inner periphery of the outer ring;
    an elastic member provided between the rollers of the roller pair to elastically urge the rollers away from each other; and
    a pair of pressing members, the pressing members being relatively rotatable with respect to the input shaft and turned in predetermined directions opposite to each other to press the rollers of the roller pair such that the rollers approach each other against the urging by the elastic members.

7. The steering system according to claim 3, wherein the clutch includes:
    an inner ring provided to the input shaft;
    an outer ring provided to the radial ring portion of the worm wheel so as to be relatively rotatable with respect to the inner ring;
    a roller pair having rollers disposed side by side in a circumferential direction of the inner ring in a wedged space formed by an outer periphery of the inner ring and an inner periphery of the outer ring;
    an elastic member provided between the rollers of the roller pair to elastically urge the rollers away from each other; and
    a pair of pressing members, the pressing members being relatively rotatable with respect to the input shaft and turned in predetermined directions opposite to each other to press the rollers of the roller pair such that the rollers approach each other against the urging by the elastic members.

8. The steering system according to claim 4, wherein the clutch includes:
    an inner ring provided to the input shaft;
    an outer ring provided to the radial ring portion of the worm wheel so as to be relatively rotatable with respect to the inner ring;
    a roller pair having rollers disposed side by side in a circumferential direction of the inner ring in a wedged space formed by an outer periphery of the inner ring and an inner periphery of the outer ring;
    an elastic member provided between the rollers of the roller pair to elastically urge the rollers away from each other; and
    a pair of pressing members, the pressing members being relatively rotatable with respect to the input shaft and turned in predetermined directions opposite to each other to press the rollers of the roller pair such that the rollers approach each other against the urging by the elastic members.

\* \* \* \* \*